Oct. 5, 1926.

G. W. ZUCKER

WEIGHING SCALE

Filed April 6, 1923    3 Sheets-Sheet 1

1,602,218

Inventor
George W. Zucker
By Vernon E. Hodges
his Attorney

Oct. 5, 1926. 1,602,218
G. W. ZUCKER
WEIGHING SCALE
Filed April 6, 1923 3 Sheets-Sheet 2

Oct. 5, 1926.

G. W. ZUCKER 1,602,218

WEIGHING SCALE

Filed April 6, 1923    3 Sheets-Sheet 3

Inventor
George W. Zucker
By Vernon B. Hodges
his Attorney

Patented Oct. 5, 1926.

1,602,218

UNITED STATES PATENT OFFICE.

GEORGE W. ZUCKER, OF HAZLET, NEW JERSEY.

WEIGHING SCALE.

Application filed April 6, 1923. Serial No. 630,276.

My invention relates to weighing scales.

The present invention is an improvement upon, or a development of, the invention set forth in Letters Patent granted to me March 20, 1923.

In the above-mentioned patent, the fundamental idea is to weigh in reverse of the ordinary methods of weighing. That is to say, the material is placed on the scales in bulk, the indicating hand is placed at zero and as the material is removed, the hand indicates the amount removed.

The object of my present invention is to provide a means to cause the pinion of the scales to be so engaged with the rack that it will rotate either in a clockwise or counter-clockwise direction accordingly as desired by a simple adjustment of the rack, or so that the rack can be disengaged altogether from the pinion, or, in other words, placed in "neutral" position.

With the foregoing object in view, this invention consists of a double rack arranged astride the pinion and adapted to be moved so that the desired rack will be brought into mesh with the pinion teeth accordingly as the scales are to be used for ordinary or reversed weighing, or in a "neutral" position with neither rack in engagement with the teeth of the pinion.

In the accompanying drawings:

Figs. 4 and 5 are two views at right angles to each other of the spring keeper for fastening the rack.

Figure 1:
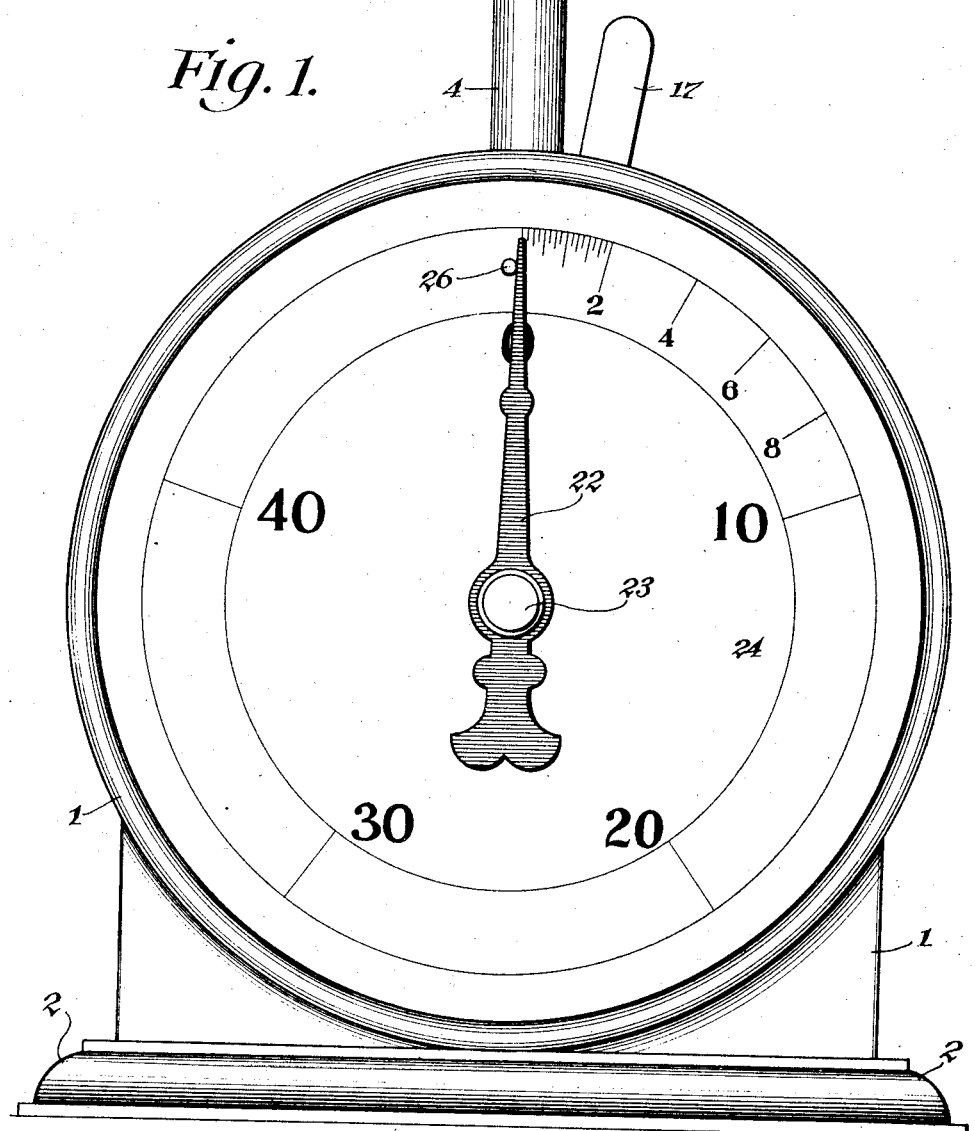
Fig. 1 is a front view.
Figure 2:
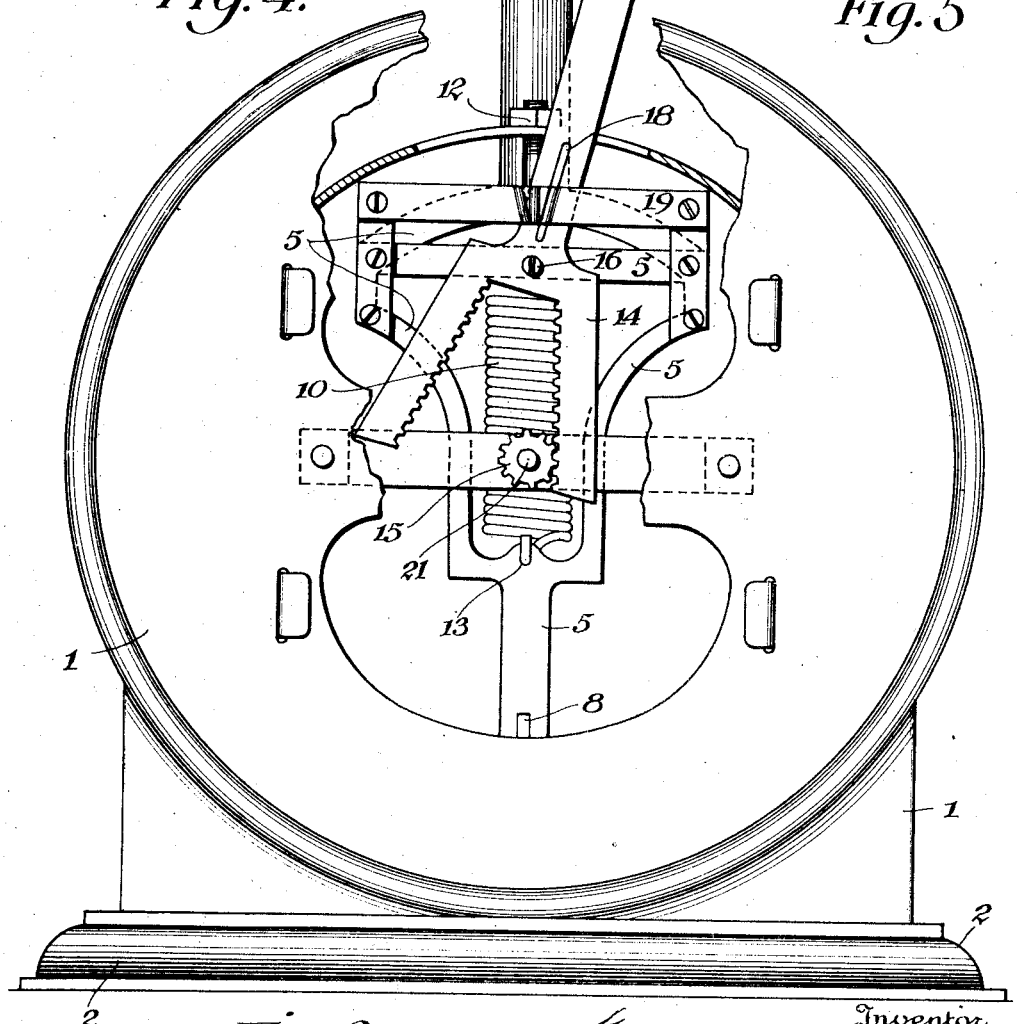
Fig. 2 is a similar view with a portion of the front broken away.
Figure 3:
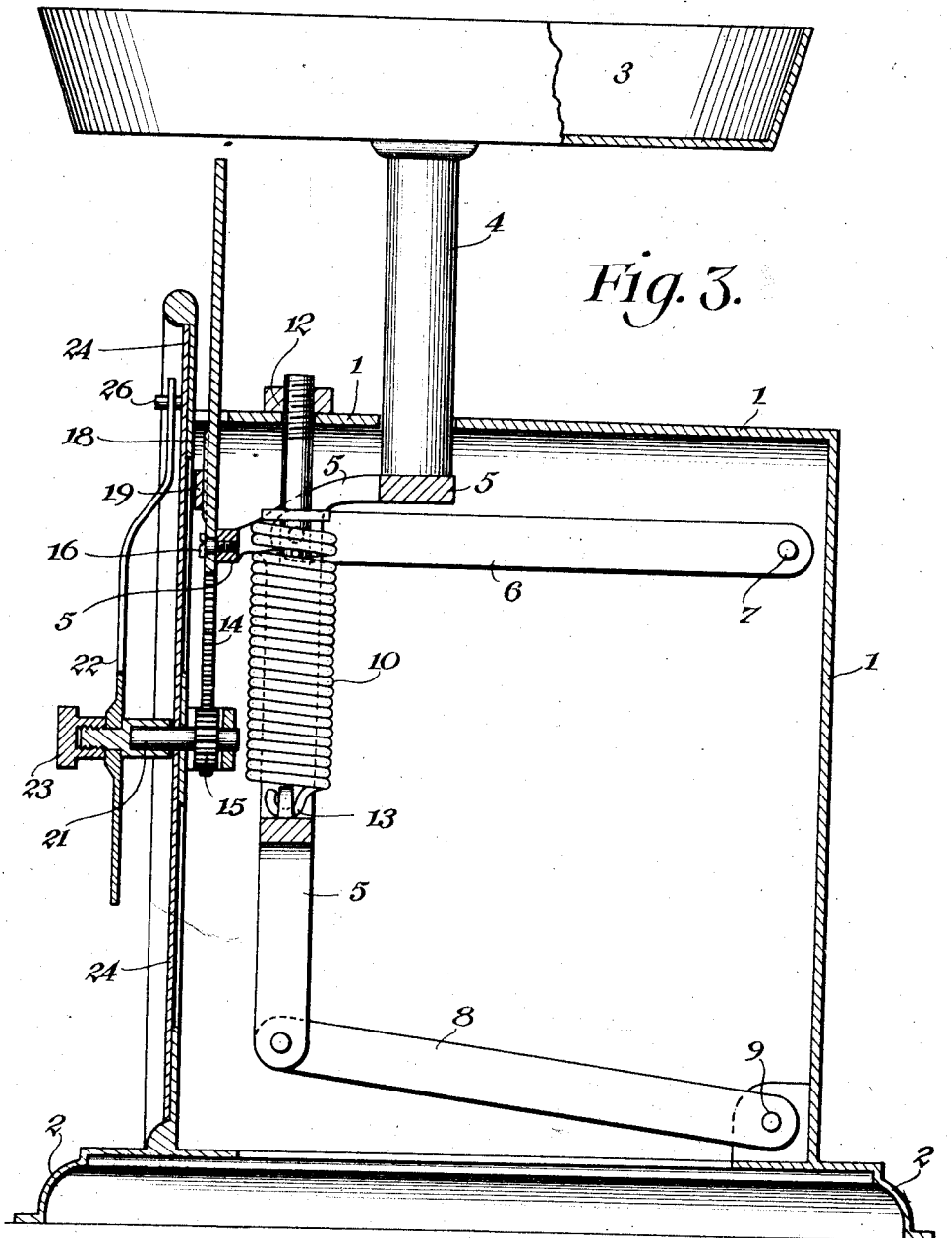
Fig. 3 is a longitudinal vertical section.

The numeral 1 indicates the casing of the scale, adapted to enclose the weighing mechanism, which is supported upon a suitable base 2. It is understood any form of weighing mechanism may be used, the invention being of such a nature that it can be applied to any form of weighing-scale by a slight modification; and the weighing mechanism herein shown is illustrated merely for the purpose of showing one application of the invention upon a well-known scale.

The numeral 3 indicates a receiver mounted upon a suitable support 4, the latter being secured to a frame 5. The upper end of the frame is pivotally connected to a horizontally arranged beam 6 pivoted at its opposite end as at 7 to the casing 1. Connected to the lower end of the frame 5 is a similar beam 8, which is likewise pivoted at its opposite end, as at 9, to the casing 1.

A vertically-arranged spring 10 is adjustably secured at its upper end, as at 12, to the casing 1, and the lower end thereof is secured as at 13 to the frame 5.

A double rack 14 is movably mounted astride a pinion 15 and, while it may be mounted in various ways, as a convenient means it is held pivotally attached to some part of the frame 5 by a screw or pin 16. A handle or equivalent means 17 projects through an opening in the top of the casing 1 as a means for shifting the rack. In the particular form shown, the entire device presents the general appearance of an inverted letter Y, the two sets of rack teeth diverging from the center in order to bring one set of teeth or the other into the proper vertical position with relation to the teeth of the pinion 15 as the receiver of the scales moves up and down, in the weighing operation, or to a "neutral" position with neither rack in engagement with the pinion when desired.

The double rack 14 and the pinion 15 are so arranged as to effect either a clockwise or a counter-clockwise movement to a stub shaft 21, to which the pinion 15 is keyed, according to the set or adjustment of the rack.

While any means of fastening the double rack in position might be employed, the means shown is a simple method and includes a ridge 18 on the projecting handle 17 and a spring keeper 19 secured to some part of the frame, so as to embrace the handle, and this spring keeper is provided with three notches 20 as shown in Figs. 4 and 5 into which the ridge 18 fits to lock the double rack in adjusted position.

An indicating hand 22 is removably and resettably secured to the stub shaft 21 and is provided with a knob 23 for convenience in setting and resetting the hand.

A dial 24 is arranged upon the face of the casing 1, and at the zero point of the dial, a pin 26 may be placed as a means for setting or resetting of the hand although it is obvious that this pin may be dispensed with altogether, it being used as a matter of convenience.

If desired to weigh in the manner of ordinary scales, the operator reverses the handle 17, that is to say, pushes it to the right throwing the right hand side of the rack into mesh with the teeth of the pinion, and proceeds as he would with any ordinary scales. By moving the hand 17 to the central notch 20, the double rack assumes a "neutral" position.

In the use of these scales, for instance, in the feeding of live-stock, the handle 17 could be set at "neutral", i. e. with neither set of rack teeth in engagement with the pinion and a quantity of material could be placed on the receiver of the scales, as the amount is wholly immaterial. Or, if desired, by pushing the hand lever 17 to the right to bring the right hand set of teeth into mesh with the teeth, the material can be weighed as it is put on the receiver of the scales to determine the gross weight, and thereafter changed to weigh "off" by reversing the hand lever 17, or pushing it to the left, then as a ration is removed from the receiver, say two pounds, the indicating hand 22 will move in a clock-wise direction until the desired amount is removed. The hand is then reset to zero and the operator repeats the operation as often as desired.

A further illustration of the convenience and simplicity of the invention is shown in adapting it to the handling of baggage. In this case where a truck is used, the truck, together with its load, is rolled upon the scales, the weight of the truck or the men on the truck being immaterial. Then as each article is removed from the truck, the weight of that particular article is indicated by the indicating hand and likewise the weight of each and every article removed therefrom may be readily determined by re-setting the indicating hand for the removal of each article.

It is apparent that more or less slight changes might be made in the construction shown without departing from the spirit of the invention, the construction illustrated being only one of many that my invention comprehends and is intended to cover.

I claim:

1. Weighing scales including a pinion, adjustable means in position to engage said pinion, and means for moving said adjustable means into and out of engagement with the pinion for weighing on or weighing off.

2. Weighing scales including reversing means capable of being adjusted whereby the scales may be used to weigh by either placing the article or articles to be weighed thereon, or by removing the same therefrom, said reversing means including a pinion and a double rack and means for causing the pinion to mesh with either set of rack teeth.

3. Weighing scales including reversing means capable of being adjusted whereby the scales may be used to weigh by either placing the article or articles to be weighed thereon, or by removing the same therefrom, said reversing means including a pinion and a double rack with its teeth astride the pinion, means for bringing either set of teeth and pinion into mesh with each other and means for locking the double rack in either of said adjusted positions.

4. Weighing scales including reversing means capable of being adjusted whereby the scales may be used to weigh by either placing the article or articles to be weighed thereon, or by removing the same therefrom, said reversing means including a pinion and a double rack with its teeth astride the pinion, means for bringing either set of teeth and pinion into mesh with each other, means for locking the double rack in either of said adjusted positions, and means for securing the double rack in a "neutral" position.

5. Weighing scales including reversing means capable of being adjusted whereby the scales may be used to weigh by either placing the article or articles to be weighed thereon, or by removing the same therefrom, said reversing means including a pinion, a double rack pivotally mounted with its two sets of teeth astride the pinion.

6. Weighing scales including reversing means capable of being adjusted whereby the scales may be used to weigh by either placing the article or articles to be weighed thereon, or by removing the same therefrom, said reversing means including a pinion, a double rack pivotally mounted with its two sets of teeth astride the pinion, a handle for shifting the double rack and means for fastening the double rack with either set of teeth in engagement with the pinion or in a "neutral" or intermediate position.

7. Weighing scales including a pinion, and adjustable racks, one in position to be moved into engagement with one side of the pinion and the other in position to be moved into engagement with the opposite side of the pinion for weighing on or weighing off.

8. Weighing scales including a pinion, adjustable racks, one in position to be moved into engagement with one side of the pinion and the other in position to be moved into engagement with the opposite side of the pinion for weighing on or weighing off, and means for moving the racks into and out of engagement with the pinion.

In testimony whereof I affix my signature.

GEORGE W. ZUCKER.